Figure 1:
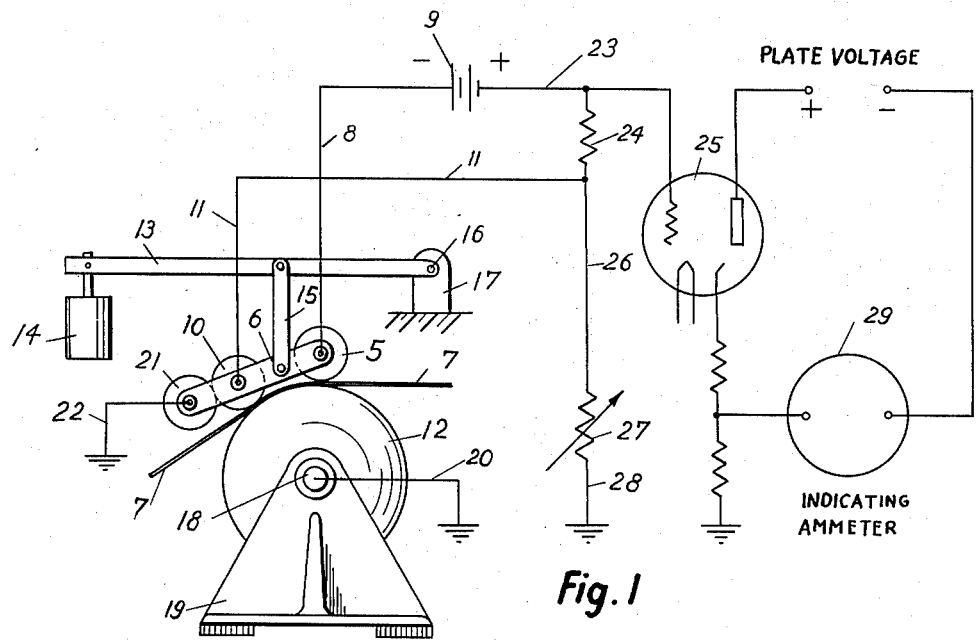

Aug. 26, 1952    R. S. HART    2,608,604
TEMPERATURE COMPENSATED CONTACTOR
Filed May 7, 1951

Raymond S. Hart
INVENTOR.
BY M. Bjorndes
Atty.

Patented Aug. 26, 1952

2,608,604

UNITED STATES PATENT OFFICE 2,608,604

TEMPERATURE COMPENSATED CONTACTOR

Raymond S. Hart, Brooklyn, N. Y.

Application May 7, 1951, Serial No. 224,966

2 Claims. (Cl. 175—183)

This invention relates to a new and useful improvement in temperature compensated contactors, for the continuous indicating and recording of moisture content in sheets, such as paper, fabric and the like, and specifically it refers to the use of a conductive resilient roller of a desired temperature co-efficient designed to compensate for inaccuracies in reading due to temperature changes.

Reference is made to my co-pending application, Serial No. 224,965, filed May 7, 1951. In the manufacture of paper and textiles of various kinds, it is always desirable to know and be able to control at all times the amount of moisture in the materials. A great many types of moisture meters have been suggested for the continuous indication, measuring and recording of the moisture content, but most of these have been unsatisfactory for several reasons. The most successful method has been the use of conductivity measurements, but even here accuracy of the measurements were greatly effected by the variation in temperatures of the sheets.

This has not been heretofore, possible with metallic contactors. It is well known, for instance, that paper has a very pronounced positive temperature co-efficient, so that with increasing temperature, the resistance increases and vice versa. The same is true of other sheet materials, such as textiles and fibres of various kinds. The present invention eliminates this difficulty by utilizing a resilient conductive roller contactor of a resistance sufficiently high to give a suitable variation in temperature. This resistance may either be of a negative temperature co-efficient, so as to directly counteract the resistance changes in the paper, or the temperature variable resistance of the roller may be conducted in a control circuit, so as to achieve the same effect by proper amplification and reverse procedure if required. In this manner and as hereinafter, set forth in detail it is possible to eliminate all inaccuracies in the continuous and rapid indication, recording and control of moisture content in paper mills, textile mills, etc.

The main object of my invention, is to provide a temperature compensated contacting roller, which will supply a control parameter sufficient to eliminate any deviations due to temperature changes in the sheet to be measured.

Another object of my invention is to provide a circuit in which the temperature variable resistance of the contacting roller may be utilized to vary the output of the material to be measured.

An ancillary object of my invention is to provide a temperature compensated contactor roller of simple and low cost design which may be utilized in factories with a minimum of operating difficulties.

Other objects and advantages of this invention, will be apparent during the course of the following description.

Figure 2:
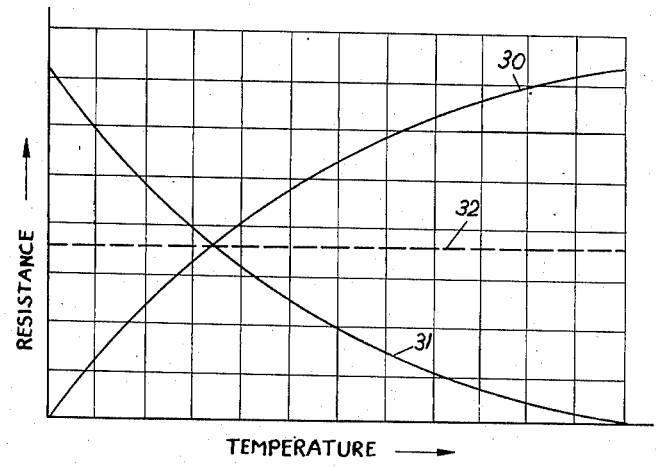

In the accompanying drawing, forming a part of this specification, in which like numerals designate like parts throughout the same:

Figure 1 represents a schematic circuit diagram illustrating an embodiment of my invention, and, Figure 2 illustrates by means of curves how my invention works, In the drawing, wherein for the purpose of illustration, is shown a preferred embodiment of my invention, the numeral 5 designates a metallic contacting roller which is mounted upon the insulating yoke 6. The metallic roller 5, is free to rotate with the motion of the sheet 7, and the roller is electrically connected by means of wire 8, through the negative side of battery 9.

A second roller 10, is also rotatably mounted in the yoke 6, and is connected to the circuit by means of wire 11. The roller 10, is of the type disclosed in my co-pending application, referred to supra, and consists of an inner metallic roller with an outer resilient conductive tire.

The two rollers 5 and 10, are pressed down against the sheet 7, which is moving over roller 12, by means of a lever 13, with weight 14 and link 15. The lever 13 is pivoted at 16, to a fixed support 17. The roller 12 is journaled in bearings 18, supported upon supports 19, and the roller 12 is grounded by means of wire 20.

The yoke 6, which is insulated from ground, and made preferably of a suitable insulating material, also insulates rollers 5 and 10 from one another. The yoke 6, furthermore, carries a third roller 21, which is in contact with roller 10, and is rotated by the latter, by means of friction with same. The roller 21, is similar to roller 10, and is constructed with an inner metallic roller, with an outer resilient conductive tire, as described supra. The roller 21, is connected to ground by means of wire 22.

A wire 23, connects the positive side of battery 9, to the grid resistor 24, and to the grid of tube 25. A wire 26, connects wire 11, grid resistor 24 and the variable bias resistor 27. A wire 28, connects the variable bias resistor 27 to ground.

The plate of tube 25, is connected through a suitable plate voltage supply to the indicating meter 29, which may be a milliammeter or microammeter of suitable construction. The remaining circuit components are those usually used in a circuit of this type.

Figure 2 gives a purely theoretical illustration of the method obtaining temperature compensation, by use of a negative temperature co-efficient resistor. The curve 30 is the graphic illustration of the variation in resistance of the sheet to be measured. The resistance is illustrated as varying from zero at zero temperature to a maximum at maximum temperature. Curve 31, shows how the resistance of the negative temperature co-efficient contacting roller varies with temperature, from a maximum at zero temperature to a minimum at a high temperature. The combination of these two curves gives a practically straight line 32, which is the compensated output of the circuit.

The operation of my invention may be described as follows:

To regulate the output of the tube by means of the grid resistor 24, would require a variable resistance of extremely high values, while the regulation by means of the grid bias resistor 27, is possible with only low or medium resistance values. In the present case, therefore, the compensating resistance elements formed by rollers 10 and 21, are arranged to be in shunt or parallel to the grid bias 27. As illustrated in Figure 1, there are actually two shunts, one through wire 11 to roller 10, through sheet 7, to roller 12, and through wire 20 to ground, and the other through wire 11, to roller 10, to roller 21, and through wire 22, to ground. As mentioned above, the resistances of the rollers 10 and 21, preferably have negative resistance co-efficient, so that with increasing temperature the resistance will be lower and lower. When therefore, these resistances shunt the bias resistor 27, any temperature changes in the sheet 7, will heat roller 10, which in turn will transmit heat to roller 21, and thereby change the resistance of both 10 and 21. This change in resistance in the shunts across the bias resistor 27, will automatically change the bias of the tube and will vary the output of same.

In the circuit illustrated in Figure 1, the measurement of the moisture content in sheet 7, as it travels over roller 12, is connected by the grid current of tube 25, which goes from battery 9, through wire 23, to the grid of tube 25, then to ground and back to wire 20, to roller 21 and through sheet 7, to roller 5 and wire 8, to the negative side of battery 9. It is well known how the resistance of sheet 7, varies in accordance with the amount of moisture contained in same, and the magnitude of the grid current along with the grid voltage will vary in accordance with the resistance of sheet 7. As mentioned supra, the resistance of sheet 7, varies not only with the moisture content of same, but also with the temperature and usually it is found that when the sheet gets heated too much, so that it becomes very dry, the temperature is high and so is the resistance. The measured resistance is therefore, not proportional to the moisture content.

It is well known that the output of a vacuum tube such as the tube 25, in this circuit, varies with the so-called grid bias. While the grid resistor 24, is one of many megohms the bias resistor 27, is usually one of only a few ohms. The bias resistor 27, is shown as a variable resistor, whereby it is possible to adjust same to a suitable value in any particular case. It is also to be understood that the resistance of rollers 10 and 21, is to be chosen of a suitable value so as to give the desired regulation. By the adjustment of these factors, it is possible to obtain a regulation curve such as is indicated in Figure 2 as described above. After the proper adjustment has been made, the continued operation is automatic and the setting will always be approximately the same for the same type of material.

It is understood that the form of my invention, herewith shown and described, is to be taken as a preferred example of the same, and that various changes in the shape, size and arrangement of parts, may be resorted to, without departing from the spirit of my invention, or the scope of the subjoined claims.

Having thus described my invention, I claim:

1. A temperature compensated circuit for measuring the moisture content of a moving sheet comprising a metallic contacting roller journaled at both ends in an insulating yoke and connected to the grid of a sensitive vacuum tube indicating circuit; a sheet to be tested moving between a grounded roller and said metallic contacting roller, a second contacting roller having a tire of high resistivity material being rotatably mounted in said insulating yoke in contact with said sheet to be measured, said tire of said second contacting roller having a temperature co-efficient of resistance of a magnitude similar to that of the sheet to be measured and being connected in parallel to the grid bias resistance of said sensitive vacuum tube, whereby changes in resistance of said tire will change the bias of said tube proportionately to the changes in temperature.

2. A temperature compensated circuit for measuring the moisture content of a moving sheet comprising a plurality of contacting rollers such as described in claim 1 in which a third contacting roller is mounted in said insulating yoke in such a position as to be in intimate contact with said second contacting roller, said third contacting roller being connected to ground, and pressure means whereby said first and second contacting rollers may be held in pressure contact with said moving sheet.

RAYMOND S. HART.

REFERENCES CITED

The following references are of record in the file of this patent:

UNITED STATES PATENTS

| Number | Name | Date |
|---|---|---|
| 1,826,247 | Heppenstall | Oct. 6, 1931 |
| 2,125,378 | Kadas | Aug. 2, 1938 |
| 2,270,732 | Jones | Jan. 20, 1942 |
| 2,280,327 | Ware | Apr. 21, 1942 |
| 2,560,209 | Borell et al. | July 10, 1951 |